US005577128A

United States Patent [19]

Farinelli, Jr.

[11] Patent Number: 5,577,128

[45] Date of Patent: Nov. 19, 1996

[54] AUDIO DISTRIBUTION SYSTEM WITH CONTROLLABLE VOLUME OVERRIDE

[75] Inventor: Robert P. Farinelli, Jr., Lexington, Ky.

[73] Assignee: Elan Home Systems, L.L.C., Lexington, Ky.

[21] Appl. No.: 134,139

[22] Filed: Oct. 8, 1993

[51] Int. Cl.$^6$ .......... H04B 3/00

[52] U.S. Cl. .......... 381/81; 381/85; 381/107; 381/105

[58] Field of Search .......... 381/81, 80, 85, 381/82, 77, 105, 94; 379/391, 90, 110, 102, 159, 167

[56] References Cited

U.S. PATENT DOCUMENTS

| | | | |
|---|---|---|---|
| 3,446,976 | 5/1969 | Shaw | 381/105 |
| 3,518,375 | 6/1970 | Hawkins | 381/80 |
| 4,653,087 | 3/1987 | Galich | 379/110 |
| 4,881,123 | 11/1989 | Chapple | 381/82 |
| 5,027,426 | 6/1991 | Chiocca, Jr. | 379/90 |
| 5,131,048 | 7/1992 | Farnenelli et al. | 381/81 |

*Primary Examiner*—Curtis Kuntz
*Assistant Examiner*—Ping W. Lee
*Attorney, Agent, or Firm*—Merchant, Gould, Smith, Edell, Welter & Schmidt, P.A.

[57] ABSTRACT

A signal distribution and communication arrangement includes a main control unit remotely located and electrically coupled to a volume control panel. The volume control panel is located near a speaker, and the main control unit sends substantially continuous audio signals or an interrupting audio signal to the volume control panel for playing via the speaker. These signals can be sent on the same conductor or separate conductors. When the interrupting audio signal is present, a voltage or current source provides a level from the main control unit to the volume control panel to indicate that a volume override circuit should be engaged. Upon engagement of the volume override circuit, the interrupting audio signal is passed through to the speaker at a prescribed signal level, regardless of the volume control setting on the volume control panel.

6 Claims, 2 Drawing Sheets

20
MAIN
AUDIO SIGNAL
INTERRUPTING
AUDIO SIGNAL
22
24
26
18
CONTROL
INPUT
CONTROL SIGNAL
30
34
UP/DOWN
RAMP
GENERATOR
38
10
40
REGULATED
CURRENT
SOURCE
GERMANIUM
DIODE
42
AMP
GND.
MAIN CONTROL UNIT
32
16
BLOCKING CAP.
44
48
ZENER
DIODE
46
TAPS
CIRCUIT
SELECTOR SW.
54
RELAY
N.C.
N.O.
SPEAKER
58
56
50
14
VOLUME CONTROL PANEL
12

AUDIO DISTRIBUTION SYSTEM WITH CONTROLLABLE VOLUME OVERRIDE

FIELD OF THE INVENTION

The present invention relates generally to routing schemes for routing signals to designated facility areas (or "audio zones") and, more particularly, to signal distribution control arrangements for routing and controlling audio signals, paging signals, etc.

BACKGROUND OF THE INVENTION

Home owners are rapidly becoming aware of the benefits of home audio distribution systems. These benefits include convenient access to audio signals throughout the home, more efficient use of space and savings in the form of fewer system components, and the ability to provide customized control over the audio as it is distributed to the audio zones.

In a number of presently implemented home audio distribution systems, the system is configured using a relatively elaborate wiring distribution to connect the system's microphones, speakers and control panels in the various audio zones to a central control circuit which distributes the audio to the zones. In such systems, the present inventors have discovered that user convenience and control over the audio in the zones can be facilitated by providing a remote-control capability for overriding the volume setting control in selected zones, without going to each location to manually adjust the volume setting. For example, a user will typically turn down the volume in a particular zone using the manual volume setting control so that the user is not disturbed by continuously-playing music. The user would find it helpful, however, if the volume was returned to its normal listening level in the event that the music is interrupted by a page, a doorbell, or some other special musical or tonal audio signal.

While this type of volume-setting override function is needed for both existing systems and systems yet to be installed, this override function should be implemented without requiring costly re-routing of control wires in existing systems. Moreover, such an automatic override should be implemented so that no annoying pops are heard at the speaker when an interrupting signal is suddenly presented to the speaker.

Accordingly, there is a need for an audio distribution system having volume-setting override function to meet the afore-mentioned needs.

SUMMARY OF THE INVENTION

The present invention provides a signal distribution and communication arrangement which satisfies the aforementioned needs.

The present invention further provides a signal distribution and communication arrangement including a volume override capability which may be retrofit into an existing system without requiring any change in the wiring between a volume control panel and a main control unit.

One embodiment of the present invention concerns an arrangement for providing audio signals to a speaker in an audio distribution system. The arrangement includes a main control unit having a circuit for generating an audio signal with an information component and an audio component, and a volume control panel remotely located from the main control unit and electrically coupled thereto using an electrical conductor. The volume control panel includes a volume-level circuit, responsive to the audio component of the audio signal, for providing a first audio signal and a second audio signal. The volume control panel selects one of the first and second audio signals and couples the selected signal to the speaker in response to the information component.

In another embodiment of the present invention, an audio distribution arrangement includes a main control unit remotely located and electrically coupled to a volume control panel. The volume control panel is located in proximity of a speaker, and the main control unit sends substantially continuously generated audio signals, as well as interrupting audio signals, through the volume control panel for playing via the speaker. The main control unit provides an audio signal having an information component (e.g., a prescribed current level) and an audio signal component. The volume control panel receives this signal and separates the information component from the audio component. The audio component is attenuated and passed to a selected terminal, which is connected to one input of a relay. Another input of the relay also receives the audio component but at another signal level which is not manually selectable. The relay is controlled by an engagement circuit which engages the relay in response to detection of the information component, so that the relay normally passes the audio component at a first (manually-set) audio level when the substantially continuously generated audio signal is present and passes the audio component at a second (fixed) audio level when the information signal and interrupting audio signal is present.

The above summary of the present invention is not intended to represent each embodiment, or every aspect, of the present invention. This is the purpose of the figures and the associated description which follow.

BRIEF DESCRIPTION OF THE DRAWINGS

Other aspects and advantages of the present invention may become apparent upon reading the following detailed description and upon reference to the drawings in which.

Figure 1:
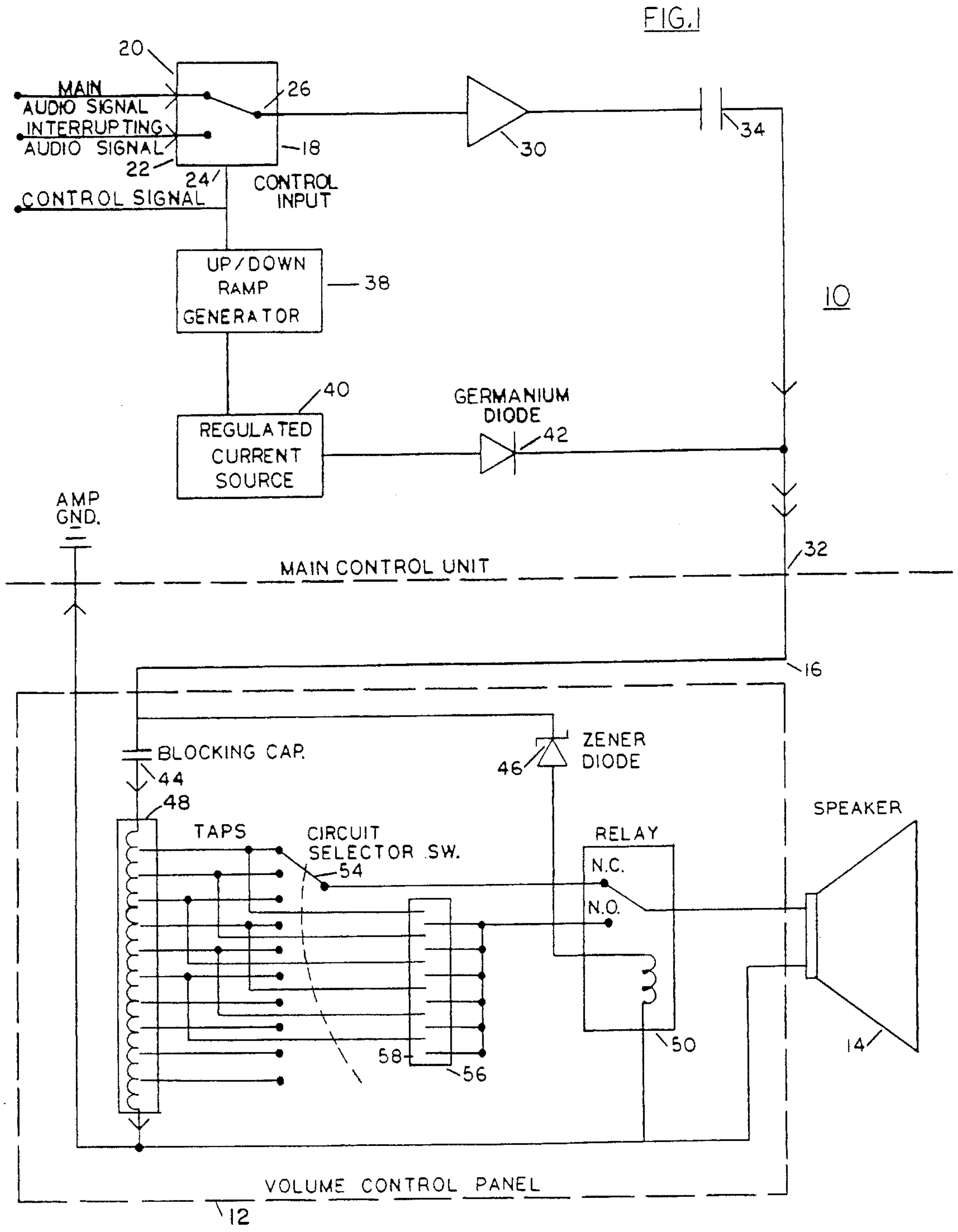
FIG. 1 is a block diagram of an audio distribution arrangement, in accordance with the present invention.

While the present invention is susceptible to various modifications and alternative forms, specific embodiments thereof have been shown by way of example in the drawings and will be described in detail below. This should be understood, however, that the intention is not to limit the invention to the particular forms described and illustrated. On the contrary, the intent to cover all modifications, equivalents and alternative forms fall within the spirit and scope of the invention as defined by the appended claims.

DETAILED DESCRIPTION OF THE DRAWINGS

Turning now to the drawings and particularly FIG. 1, there is shown an audio distribution arrangement including a main control unit 10 and a volume control 12. The main control unit provides audio signals and control signals to the volume control panel 12 for playing through a speaker 14. The control signals provided by the main control unit are provided on the same lead (wire) 16 as the audio signals, and these control signals are used to change the volume of the audio signal being sent through the volume control panel 12 to the speaker 14.

This type of arrangement is ideally suited for retro-fitting existing audio distribution systems so that a remotely located main control unit can use existing wiring to provide an automatic override signal to a volume control panel located at a particular zone. Because the control signals are sent on the same lead as the audio signals, no additional wiring is necessary.

The main control unit includes a selector switch (e.g., a relay) 18 having a first input 20 for receiving a substantially continuous audio signal, a second input 22 for receiving an interrupting audio signal, and a control signal input 24 for receiving a control signal which determines which of the first and second inputs is to be connected to the output 26 of the selector switch 18. During normal operation, the output 26 of the selector switch 18 provides the audio signal at the first input 20 to an audio amplifier 30, the output of which is AC-coupled to the output 32 of the main control unit 10 via a blocking capacitor 34.

In response to a page, doorbell, mute (no signal) or other type of interrupting signal, the control signal commands the selector switch 18 to pass the interrupting signal to the amplifier 30 and simultaneously engages an up/down ramp generator 38 and a regulated current source 40. The up/down ramp generator 38 provides a linear ramp-up or ramp-down signal which effectively slows down the rise and fall times of the control signal, for example, to approximately 250 milliseconds, so that no annoying pops are heard at the speaker 14 as a result of the signal switching at the selector switch 18. In this manner, the regulated current source 40 provides a controlled current signal having a magnitude which corresponds to the linear ramp-up or ramp-down signal provided by the up/down ramp generator 38. The updown ramp generator 38 can be implemented using a conventional 555 timer circuit which provides a linear ramp voltage, and the regulated current source 40 can be implemented using an LM317 adjustable regulator circuit which provides a fixed current output.

The controlled current signal provided at the output of the regulated current source 40 is passed through a germanium diode 42, which is used to block current returning from the volume control panel 12. The diode 42 has a low forward conduction voltage to virtually eliminate popping at the speakers once the diode starts to conduct.

The controlled current signal passing through the diode 42 and the AC-coupled audio signal are combined to provide to the volume control panel, via a single conductor 16, an audio signal having an audio component for playing through the speaker 14 and a current-level information component for indicating whether or not to override the manually-set volume control in the volume control panel 12. By indicating to the volume control panel 12 that the manually-set volume control should be overridden, the interrupting audio signal (which is present in conjunction with the control signal received at the input 24 of the selector switch 18) is used by the volume control panel 12 to provide the interrupting audio signal at a preset volume level. This insures that, if the manually set volume control in the volume control panel 12 is turned down, the interrupting audio signal can be heard by the user.

The volume control panel 12 receives the audio signal provided on the conductor 16 at a junction connecting an electrolytic blocking capacitor 44 and a zener diode 46. The blocking capacitor 44 functions to couple only the audio component of the audio signal on the conductor 16 to a transformer circuit 48, and the zener diode 46 is selected so that its current-breakdown threshold corresponds to a predetermined current level threshold sensed on the conductor 16 and indicating that the manually set volume control should be overridden.

The transformer circuit 48 includes two sets of output taps, which are used in conventional volume control panels to attenuate, in a step-down manner, the signal received at the input of the transformer circuit 48. One set is used by a manually-adjustable selector switch 54 to select an attenuation level for the audio signal passing through the transformer circuit 48, and the other set is selected by installing a jumper wire onto a jumper block 58 to select a different attenuation level for the audio signal passing through the transformer circuit 48. A relay 50 determines which attenuation setting is used to attenuate the audio signal passing through to the speaker 14.

The relay 50 responds to the zener diode 46 sensing this current level threshold by switching from the normally closed position (as depicted in FIG. 1) to the normally open position. In the normally closed position, the relay 50 connects the output tap, as selected by the manually-adjustable selector switch 54, to the speaker 14. When the relay 50 switches to the normally open position, the relay 50 connects the output tap, as selected by a jumper wire 56 on the jumper block 58, to the speaker 14.

In this manner, whenever the control signal is received by the selector switch 18 and the up/down ramp generator 38 of the main control unit 10, the audio signal on conductor 16 carries a DC voltage which is responded to by the zener diode 46 of the volume control panel 12. The zener diode 46 detects this voltage level exceeding its zener threshold and provides a sudden D.C. voltage to relay 50, thereby minimizing relay chatter. In response, the relay 50 engages. Thus, the volume control panel 12 forces the audio component of the signal carried by the conductor 16 to be played through the speaker 14 at the preselected attenuation level, independently of the manually-adjusted volume setting.

Figure 2:
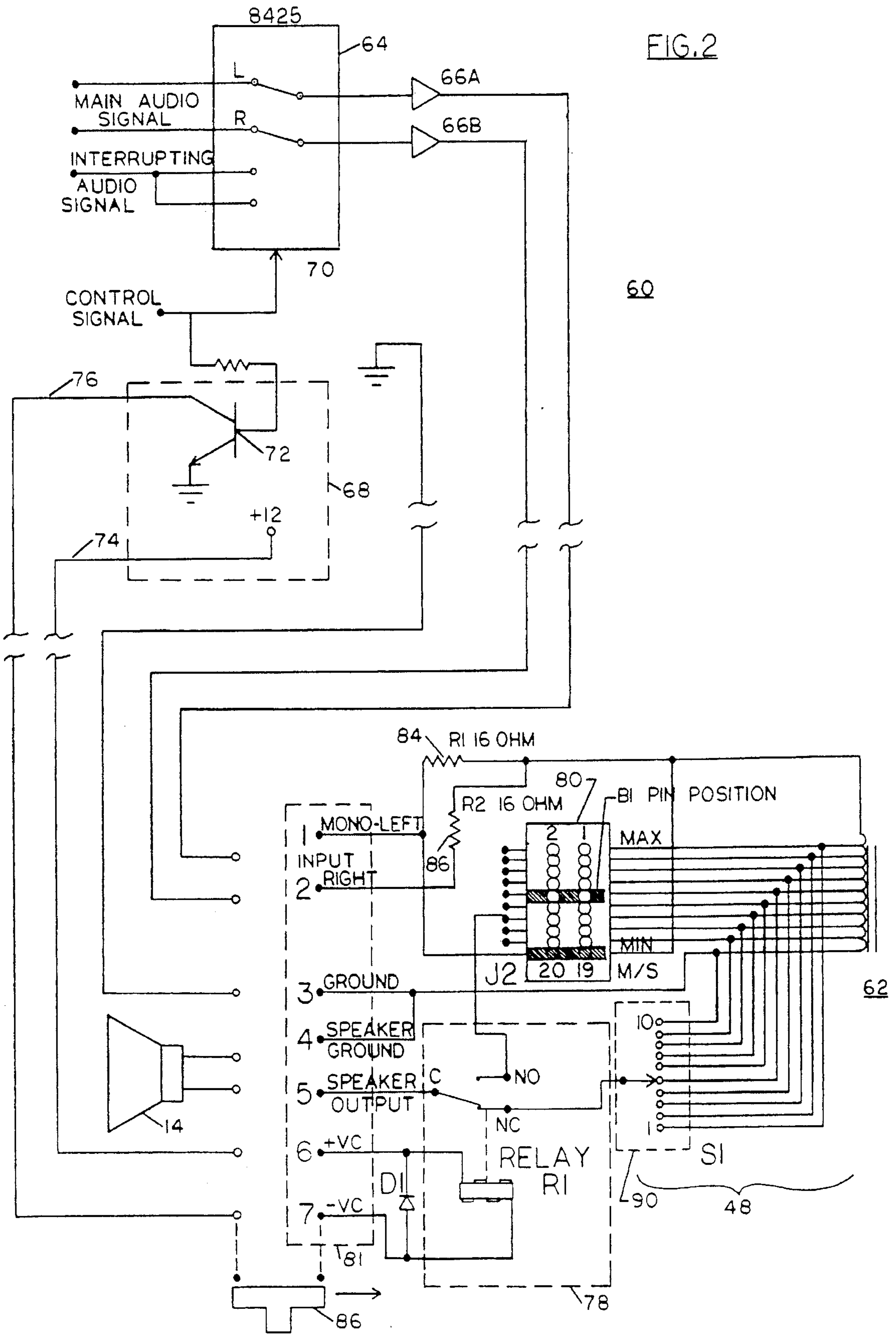
FIG. 2 is another block diagram of an audio distribution arrangement, also in accordance with the present invention, which may be used as an alternative to the arrangement shown in the block diagram of FIG. 1.

Referring now to FIG. 2, an alternative block diagram for the override function of FIG. 1 is illustrated. This implementation is best suited for new installations but can be retrofit by routing additional conductors from the main control unit to the volume control panel. As the block diagram of FIG. 2 depicts, the main control unit 60 and the volume control panel 62 of FIG. 2 are different than the main control unit 10 and the volume control panel 12 of FIG. 1.

The main control unit 60 of FIG. 2 includes three active sections: a double-line switch 64, a pair of amplifiers **66*a* and 66*b*, and a voltage source 68. The double-line switch 64 essentially provides the same function as the selector switch 18 of FIG. 1, but for a two-wire (or stereo) audio signal. The switch 64 responds to a control signal at a control input 70 by connecting the interrupting audio signal, instead of the main audio signal, to the output of the switch 64. In this configuration, the switch 64 can accommodate either the interrupting audio signal or the main audio signal as a stereo signal having a left channel and a right channel. From the output of the switch 64, the audio signal passing through the switch 64 is amplified by amplifiers 66*a* and 66*b***, one amplifier for each of the channels.

To implement the override function for the volume setting in the volume control panel 62, the voltage source 68 is activated by the control signal connected to the base of a transistor 72. The transistor 72 provides a current path for returning a 12-volt signal sent to the volume control panel via conductor 74 and returned via conductor 76 from the collector to the emitter of the transistor 72, and to common (or ground).

The volume control panel 62 responds to this voltage level provided by the voltage source 68 by engaging a relay 78 which switches from a normally closed position to a normally open position. The transformer circuit 48, which is the same one shown in FIG. 1, provides a first set of output taps for connecting to the normally closed input of the relay 78. The second set of output taps, which is configured in parallel with the first set of output taps, is connected to a jumper block 80. The jumper block 80 is used to connect one of the output taps from this second set to the normally open input of the relay 78. Thus, when the current source 68 of the main control unit 60 is engaged, the relay 78 switches from the normally closed position to the normally open position so that the volume setting established by the jumper selection on the jumper block 80 automatically provides the interrupting audio signal at the pre-established level for the speaker 14.

The bottom position on the jumper block 80 depicts another important aspect of the present invention. The selected audio signal provided through the amplifiers 66*a* and 66*b* can be a stereo signal having left and right channels or a monophonic signal. Using the bottom position on the jumper block 80, the volume control panel 62 can be configured as either a stereo receiver or a monophonic receiver. The volume control panel 62 is configured as a monophonic receiver by summing the signals amplified through the amplifiers 66*a* and 66*b* through 16-Ohm resistors 84 and 86 before the attenuation. These resistors provide isolation from left to right channel for amplifiers which are "non" bridgeable. The volume control panel 62 is configured as a stereo receiver by conducting around (or shorting) the resistor 84 so that the stereo channel connected to the first terminal of the connector jack 81 is properly attenuated and played by the speaker 14. In the stereo configuration, another volume control panel (not shown in the figures) connects to and processes the other stereo channel at the output of the amplifiers 66*a* and 66*b*, but with the connection at the first and second terminals of the connector jack 81 reversed.

The volume control panel 62 of FIG. 2 shows another manually positioned switch 88 which can be used, as an option, to bypass the override function. The switch 88 connects the conductor 76 to the last terminal of the connector jack 81 only when it is desired to have the override function operate. To bypass the override function, the switch 88 is positioned to separate these contacts thereby preventing engagement of the relay 78. This function is suited, for example, for the do-not-disturb situations in which the user does not want to be disturbed by the interrupting audio signal. By positioning the switch 88 to break the current path to the relay 78 and also by turning down the volume control (or knob) in the transformer circuit 48, the volume control panel 62 can also be completely disabled.

As an alternative to using the jumper block 80, another manually adjustable switch can be used to connect the normally-open input of the relay 78 to a selected one of the paths to which the jumper block 80 is shown connecting. Such a manually adjustable volume control is configured in substantially the same way as the volume control 90 which is part of the transformer circuit 48. Thus, using two such volume control circuits 90 with each respectively connected to the normally open and normally closed inputs of the relay 78, the user is able to independently set the respective volume levels for the main audio signal and the interrupting audio signal.

Accordingly, the present invention provides a multiplicity of arrangements for implementing a volume-control-override function in an audio distribution system. As described in connection with FIG. 1, the present invention is implemented so as to avoid the necessity of adding additional wires between a main control unit and the volume control panel. The arrangement discussed in connection with FIG. 2 illustrates numerous options and control aspects provided to the user at the volume control panel. The fixed and/or adjustable jumpers and switches of FIG. 2 can also be implemented in the volume control panel shown in FIG. 1. For instance, a switch similar to the one shown as 88 in FIG. 2 can be used in the current path on either side of the zener diode 46 of FIG. 1. Similarly, a volume control such as the one depicted as 90 in FIG. 2 can also be used in place of the jumper 66 so as to permit the user to independently and adjustably set the volume level for the interrupting audio signal when the relay 50 is switched to the normally open position.

Those skilled in the art will readily recognize that various modifications and changes may be made to the present invention without departing from the true spirit and scope thereof, which is set forth in the following claims.

What is claimed is:

1. For use in an audio distribution system, an arrangement for providing audio signals to a speaker, comprising:

a main control unit including a circuit for generating an audio signal having an audio component and an information component designating one of a plurality of different broadcast levels;

a volume control panel remotely located from the main control unit and electrically coupled thereto, the volume control panel including a volume-level circuit, responsive to the audio component of the audio signal, for providing a first audio signal and a second audio signal, and the volume control panel including a circuit which responds to the information component by broadcasting the second audio signal to the speaker at a designated one of the plurality of different broadcast levels, wherein the circuit in the main control unit for generating the audio signal includes a circuit for slowly combining the information component with the audio component so as to minimizing undesirable transient sounds provided through the speaker.

2. An arrangement for providing audio signals to a speaker, according to claim 1, wherein the circuit in the main control unit for generating the audio signal includes a power source for generating the information component.

3. An arrangement for providing audio signals to a speaker, according to claim 2, wherein the circuit in the main control unit for generating the audio signal includes a capacitive circuit for AC-coupling the audio component with the information component.

4. For use in an audio distribution system, an arrangement for providing audio signals to a speaker, comprising:

a main control unit including a circuit for generating an audio signal having an information component designating one of a plurality of different broadcast levels;

a volume control panel remotely located from the main control unit and electrically coupled thereto, the volume control panel including a volume-level circuit, responsive to the audio signal, for providing a first audio signal at a first volume level and a second audio signal at a second volume level, a circuit interpreting the information component, and a decoder having a decoder output coupled to the speaker, a pair of signal inputs respectively receiving the first and second audio signals, and a control input responding to the circuit interpreting the information component and selecting one of the first and second audio signals to provided at the decoder output; and the main control unit providing the information component along with the audio signal to remotely and selectively establish one of the first and second audio signals to broadcast to the speaker at a designated one of the plurality of different broadcast levels, wherein the information component and the audio signal are provided simultaneously on one electrical conductor.

5. For use in an audio distribution system, a main control unit for providing sending audio signals to a volume control panel for play through a speaker, the main control unit comprising:

a selection circuit having an output responsive to a control signal for selecting a substantially continuous audio signal or an interrupting audio signal to provide a selected audio signal at the output; and an information-signal generation circuit, also responsive to the control signal, for generating an information signal, wherein the selected audio signal and the information signal are combined into a sending audio signal having an audio component and an information component designating one of a plurality of different broadcast levels;

the main control unit providing the information component as part of the sending audio signal to enable the volume control panel to respond remotely to provide one of a first and second audio signals to the speaker at a designated one of the plurality of different broadcast levels.

6. An arrangement for providing sending audio signals to a speaker, according to claim 5, further comprising a circuit for slowly combining the information component with the audio component so as to minimize undesirable transient sounds provided through the speaker.

* * * * *